(12) United States Patent
Ogawa et al.

(10) Patent No.: US 9,656,329 B2
(45) Date of Patent: May 23, 2017

(54) MACHINING JIG FOR ROTATABLY SUPPORTING WORKPIECE WITH RESPECT TO TOOL OF MACHINE TOOL AND MACHINING SYSTEM

(71) Applicant: FANUC Corporation, Yamanashi (JP)

(72) Inventors: Kenichi Ogawa, Yamanashi (JP); Takashi Nagatomi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/658,585

(22) Filed: Mar. 16, 2015

(65) Prior Publication Data

US 2015/0266109 A1 Sep. 24, 2015

(30) Foreign Application Priority Data

Mar. 19, 2014 (JP) .................................. 2014-056903

(51) Int. Cl.
*B23C 1/14* (2006.01)
*B23Q 1/32* (2006.01)
(Continued)

(52) U.S. Cl.
CPC .................. *B23C 1/14* (2013.01); *B23Q 1/26* (2013.01); *B23Q 1/32* (2013.01); *B23Q 3/069* (2013.01); *B23Q 17/2291* (2013.01); *B23B 3/065* (2013.01); *B23C 2260/04* (2013.01); *B23C 2270/08* (2013.01); *B23Q 1/5406* (2013.01); *B23Q 7/00* (2013.01); *Y10T 29/5109* (2015.01);
(Continued)

(58) Field of Classification Search
CPC .......... B23Q 1/267; B23Q 1/32; B23Q 3/069; B23C 1/14; B23P 23/02; Y10T 29/5109; Y10T 29/5114; Y10T 82/2511; Y10T 82/2571; Y10T 409/305656; Y10T 409/307504; Y10T 483/16
USPC .......... 29/27 C, 27 R; 82/122, 151; 409/165, 409/198; 483/14
See application file for complete search history.

(56) References Cited

U.S. PATENT DOCUMENTS 3,245,289 A * 4/1966 Nelson ................... B23Q 3/069
269/268
3,756,102 A 9/1973 Casey
(Continued)

FOREIGN PATENT DOCUMENTS

CN 102387891 3/2012
DE 102008013716 A1 9/2009
(Continued)

*Primary Examiner* — Erica E Cadugan
*Assistant Examiner* — Michael Vitale
(74) *Attorney, Agent, or Firm* — Hauptman Ham, LLP

(57) ABSTRACT

A machining jig for rotatably supporting a workpiece comprising: a rotary drive part which rotates a seating part about a rotation axis, a clamp arm which has a rotary type clamp member which cooperates with the seating part to fasten a workpiece at a position separated from the seating part in a direction along the rotation axis of the seating part, a linear drive part which moves the clamp arm in a direction along a rotation axis, a position adjusting part which adjusts a position of the clamp arm in a plane intersecting the rotation axis, and a tilt adjusting part which adjusts a tilt of the clamp member so that a rotation axis of the clamp member becomes parallel with the rotation axis of the seating part.

6 Claims, 6 Drawing Sheets

(51) Int. Cl.
*B23Q 1/26* (2006.01)
*B23Q 3/06* (2006.01)
*B23Q 17/22* (2006.01)
*B23Q 1/54* (2006.01)
*B23Q 7/00* (2006.01)
*B23B 3/06* (2006.01)

(52) U.S. Cl.
CPC ........ *Y10T 29/5114* (2015.01); *Y10T 82/2511* (2015.01); *Y10T 82/2571* (2015.01); *Y10T 409/30616* (2015.01); *Y10T 409/305824* (2015.01); *Y10T 409/306048* (2015.01); *Y10T 483/16* (2015.01)

(56) References Cited

U.S. PATENT DOCUMENTS

| | | | | |
|---|---|---|---|---|
| 7,013,544 B2 * | 3/2006 | Yasuda | ................ | B23Q 7/1431 29/27 C |
| 7,437,809 B2 * | 10/2008 | Yamamoto | ............. | B24B 9/146 29/26 A |
| 2011/0067240 A1 * | 3/2011 | Prust | ........................ | B23B 3/12 29/889.23 |
| 2012/0055309 A1 * | 3/2012 | Chen | ........................ | B23D 47/04 83/453 |
| 2012/0187890 A1 * | 7/2012 | Otsuki | ............... | G05B 19/4086 318/570 |
| 2013/0199042 A1 | 8/2013 | Prust et al. | | |
| 2013/0221594 A1 | 8/2013 | Wen | | |

FOREIGN PATENT DOCUMENTS

| | | |
|---|---|---|
| JP | 5-63738 U | 8/1993 |
| JP | 7-299697 A | 11/1995 |
| JP | 2002-263767 A | 9/2002 |
| JP | 2003-62729 A | 3/2003 |
| JP | 2007-229828 A | 9/2007 |
| JP | 2009-15464 A | 1/2009 |
| JP | 2010-82738 A | 4/2010 |
| JP | 2010-234516 A | 10/2010 |
| JP | 2011-513077 A | 4/2011 |
| WO | 2009-106268 A2 | 9/2009 |
| WO | 2015/014398 A1 | 2/2015 |

* cited by examiner

MACHINING JIG FOR ROTATABLY SUPPORTING WORKPIECE WITH RESPECT TO TOOL OF MACHINE TOOL AND MACHINING SYSTEM

RELATED APPLICATIONS

The present application claims priority to Japanese Application Number 2014-056903, filed Mar. 19, 2014, the disclosure of which is hereby incorporated by reference herein in its entirety.

BACKGROUND OF THE INVENTION

1. Field of the Invention

The present invention relates to a machining jig which rotatably supports a workpiece with respect to a tool of a machine tool, and to a machining system.

2. Description of the Related Art

In general, a machine tool with a rotating table where a workpiece to be machined is placed is called a "rotary table type machine tool". In order to precisely machine a workpiece using a rotary table type machine tool, it is necessary to reliably fasten the workpiece to the table. In relation to this, JP-A-2011-513077 proposes a machine tool with a rotary type support table which has a projection fitted into a center hole of a workpiece from below, and a friction joining type clamping mechanism which applies a pushing force to a top surface of a workpiece placed on the support table so as to strongly hold the workpiece. More specifically, the clamping mechanism of JP-A-2011-513077 is provided with an arm shaped opposing holder which can move toward a workpiece seated on the support table, a projection installed at a front end of the opposing holder so as to be fitted into a center hole of a workpiece from above, and a support part for rotatably connecting this projection to the opposing holder. When the opposing holder is moved toward the workpiece, the support part pushes the top surface of the workpiece toward the support table and rotatably holds the workpiece.

However, the projection of the support table in the machine tool of JP-A-2011-513077 is sized so as to be tightly fitted into the center hole of a workpiece, and therefore it is difficult to eject a machined workpiece by a robot or loader or other automatic device. Further, according to the machine tool of JP-A-2011-513077, positioning error of the cylinder or other drive device for driving the opposing holder causes the workpiece to be held in a state where the center hole of the workpiece is not concentric with the projection of the opposing holder. Due to this, the inlet part of the center hole of the workpiece is liable to be damaged by the projection of the opposing holder. Incidentally, when removing the projection of the support table to prevent damage to the workpiece, positioning error of the drive device of the opposing holder may cause an offset of the rotation axis of the support part from the rotation axis of the support table. In this case, slip between the top surface of the workpiece and the support part may occur during rotation of the support table, and therefore the top surface of the workpiece is liable to be damaged by the support part in the same way.

A machining jig of a machine tool which can reduce the slip between a rotating workpiece and a rotary type clamp member which pushes against the workpiece, is being sought.

SUMMARY OF THE INVENTION

According to a first aspect of the present invention, there is provided a machining jig which rotatably supports a workpiece with respect to a tool of a machine tool, comprising: a seating part on which the workpiece is placed, a rotary drive part which rotates the seating part about a predetermined rotation axis, a clamp arm which has a rotary type clamp member which cooperates with the seating part to fasten a workpiece at a position separated from the seating part in a direction along the rotation axis of the seating part, a linear drive part which moves the clamp arm in a direction along a rotation axis of the seating part, a position adjusting part which adjusts a position of the clamp arm in a plane intersecting the rotation axis of the seating part, and a tilt adjusting part which adjusts a tilt of the clamp member so that a rotation axis of the clamp member becomes parallel with the rotation axis of the seating part.

According to a second aspect of the invention, there is provided a machining jig in the first aspect, wherein the clamp arm has an arm body which rotatably supports the clamp member, and the tilt adjusting part is a sliding contact part which comprises a curved depression part which is provided on one of the clamp member and the arm body, and a curved convex part which is provided on the other of the clamp member and the arm body.

According to a third aspect of the present invention, there is provided a machining system comprising: a machine tool which has a machining jig according to the first or second aspect, a control device which generate an operational command for the machine tool based on a predetermined machining program, a measuring device which measures a position of a workpiece which is placed on a seating part, an arithmetic device which calculates an offset amount of position of a workpiece which is measured by the measuring device, from a workpiece seating reference position which is previously set in the seating part, and a correction device which corrects the operation command so that the offset amount is cancelled out while the machine tool machines a workpiece.

According to a fourth aspect of the invention, there is provided a machining system comprising: a machine tool which has a machining jig according to the first or second aspect, and a workpiece changer which can perform an operation for placing an unmachined workpiece be seated on the seating part, and an operation for ejecting from the seating part a machined workpiece by the machine tool.

According to a fifth aspect of the invention, there is provided a machining system according to the third aspect, further comprising a workpiece changer which can perform an operation for placing an unmachined workpiece on the seating part, and an operation for ejecting from the seating part a machined workpiece by the machine tool.

These and other objects, features, and advantages of the present invention will become clearer with reference to the detailed description of illustrative embodiments of the present invention which are shown in the attached drawings.

DETAILED DESCRIPTION OF EMBODIMENTS

Below, embodiments of the present invention will be explained in detail with reference to the drawings. Note that the following explanation does not limit the technical scope of the inventions which are described in the claims or the meaning of terms etc.

Figure 1:
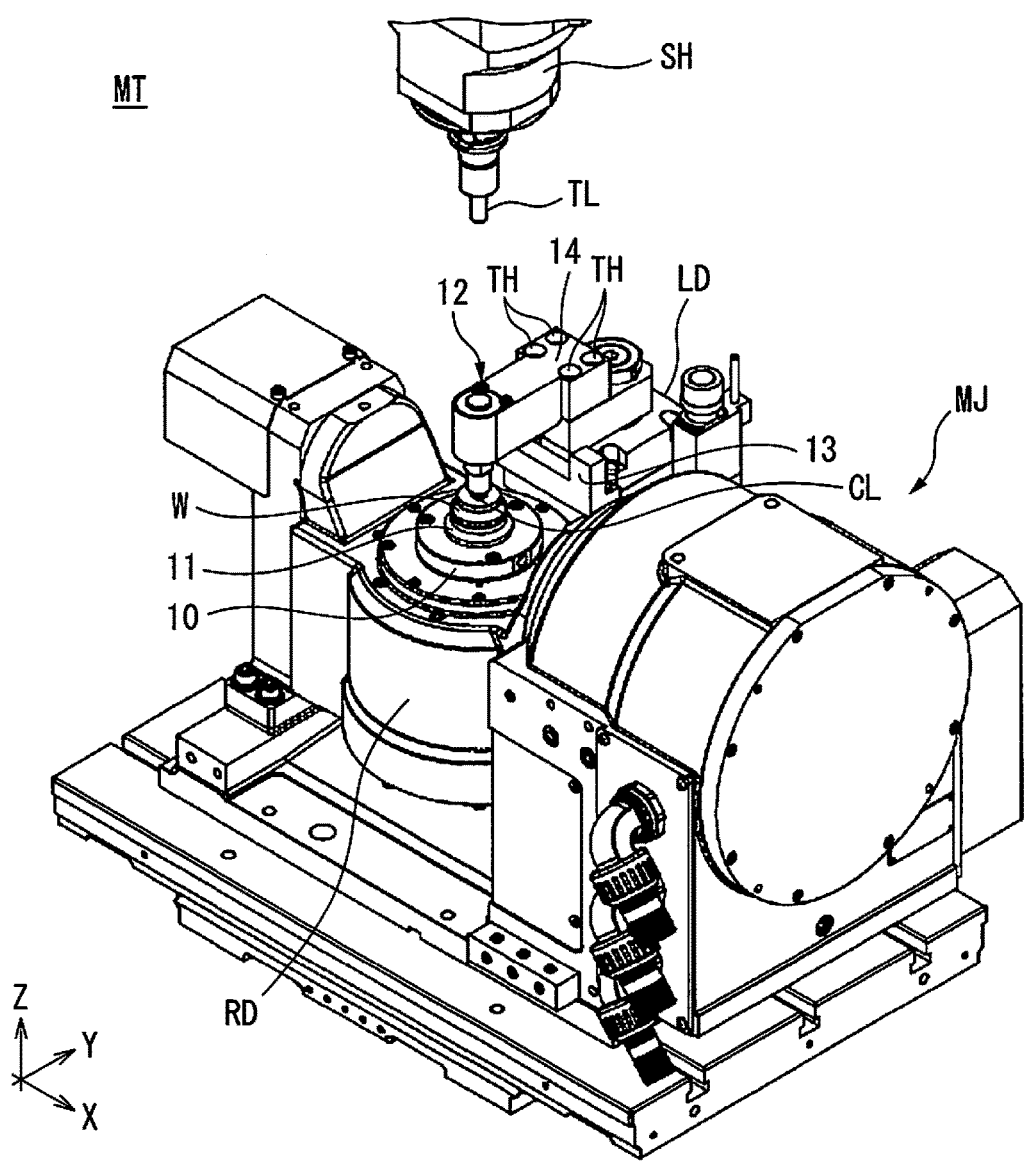
FIG. 1 is a perspective view of an illustrative machine tool which comprising a machining jig of one embodiment of the present invention.

Referring to FIG. 1 to FIG. 4, a machining jig of a machine tool according to one embodiment of the present invention will be explained. FIG. 1 is a perspective view of an illustrative machine tool MT which is provided with a machining jig of the present embodiment. The machine tool MT of the present example is a so-called rotary table type machine tool and is provided with a spindle head SH which is moved by a servo motor or other drive means in the Z-direction of FIG. 1, and a machining jig MJ which rotatably supports a workpiece W about a predetermined rotation axis. As shown in FIG. 1, the spindle head SH has an end mill or other of various cutting tools TL attached to it. The machine tool MT is configured to machine the workpiece W into a desired shape by moving the cutting tool TL relative to the workpiece W which is supported by the machining jig MJ.

Figure 2:
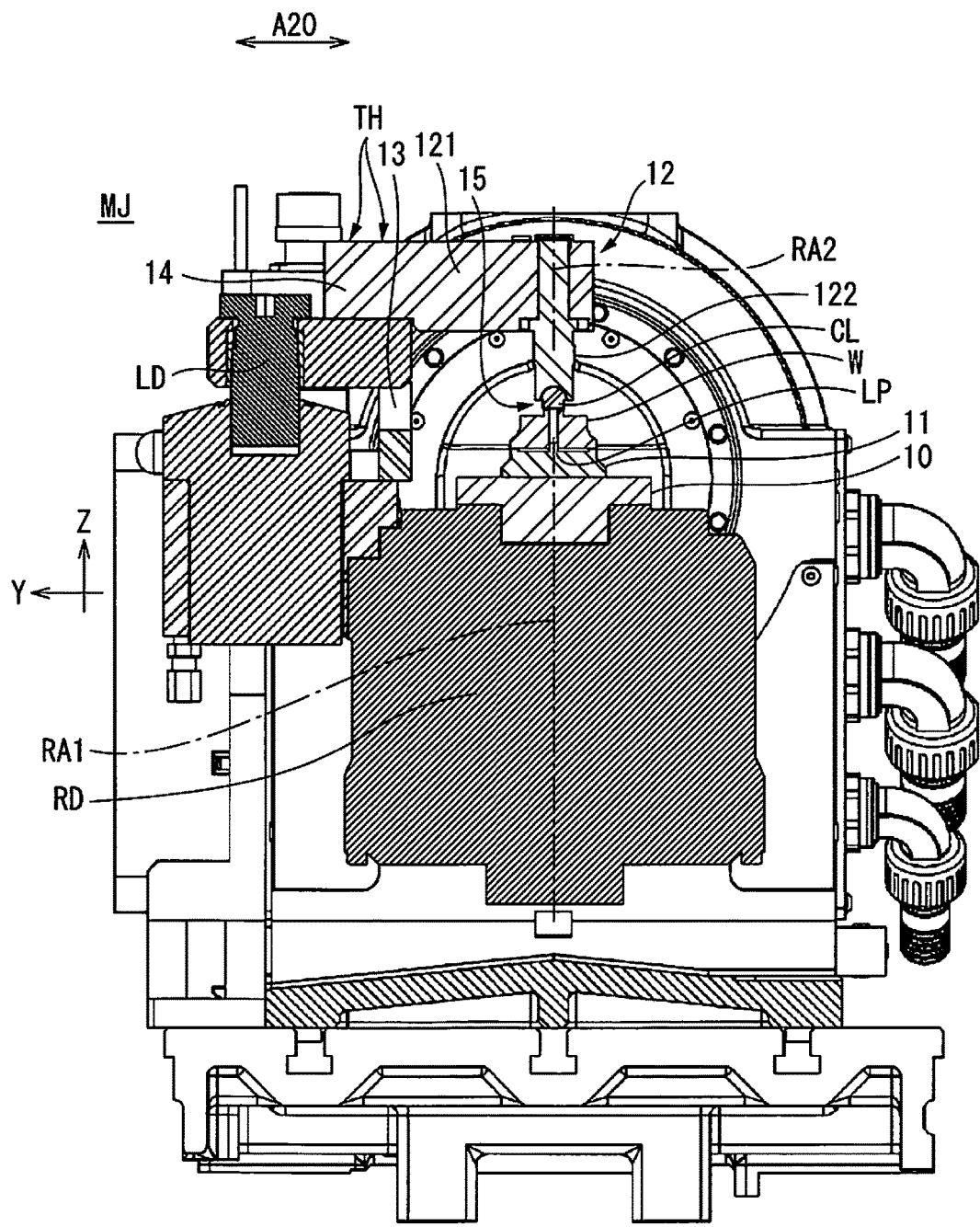
FIG. 2 is a partial enlarged view of a machining jig in a machine tool of FIG. 1 and shows a cross-section of a machining jig along a plane vertical to the X-direction of FIG. 1.

FIG. 2 is a partial enlarged view of a machining jig MJ in the machine tool MT of FIG. 1 and shows a cross-section of the machining jig MJ along the plane vertical to the X-direction of FIG. 1. As shown in FIG. 2, the machining jig MJ of the present example comprises a workpiece table 10 about the rotation axis RA1, a seating part 11 which is set on the workpiece table 10, and a rotary drive part RD which is arranged at the opposite side of the seating part 11 across the workpiece table 10. The rotary drive part RD of the present example is one of various servo motors, and configured to rotate the seating part 11 which is installed on the workpiece table 10, to a commanded rotation position about the rotation axis RA1 at the commanded rotational speed. Therefore, below, the rotation axis RA1 of the rotary drive part RD may be referred to as the "rotation axis RA1 of the seating part 11" for convenience.

As shown in FIG. 2, the workpiece W which is supported by the machining jig MJ of the present example has a disk shaped form which is provided with a through-type center hole. Further, the seating part 11 of the present example has a disk shaped form with dimensions corresponding to the workpiece W to be machined, and the workpiece W is intended to be placed on a top surface of the seating part 11. Further, the top surface of the seating part 11 of the present example is provided with a columnar shaped positioning projection LP which is inserted into a center hole of the workpiece W. This positioning projection LP is used to position the workpiece W with respect to the seating part 11. Note that, to enable the machined workpiece W to be easily detached from the seating part 11, the dimension of the positioning projection LP in the diametrical direction is somewhat smaller than the dimension of the center hole of the workpiece W in the diametrical direction.

As shown in FIG. 2, the machining jig MJ of the present example comprises a clamp arm 12 which has a rotary type clamp member CL at a position separated from the seating part 11 in a direction along the rotation axis RA1, a linear drive part LD which moves the clamp arm 12 in a direction along the rotation axis RA1, and a guide part 13 which guides a clamp arm 12 which is driven by the linear drive part LD. The detailed structure of the clamp arm 12 of the present example will be explained later. Further, the linear drive part LD of the present example is one of various actuators, and has a moving part which is connected with the base end part of the clamp arm 12. Further, the machining jig MJ of the present example further comprises a position adjusting part 14 which is interposed between the clamp arm 12 and the linear drive part LD, and is configured to adjust the position of the clamp arm 12 in a plane intersecting the rotation axis RA1.

As shown in FIG. 1 and FIG. 2, the position adjusting part 14 of the present example is installed on a base end part of the clamp arm 12, and has a plurality of through holes TH through which a plurality of mounting screws (not shown) may be inserted for connecting the clamp arm 12 and the linear drive part LD. Further, the dimensions of the through holes TH of the position adjusting part 14 of the present example in the diametrical direction are larger than the dimensions of the mounting screws to be inserted in the diametrical direction. In this way, the through holes TH of the position adjusting part 14 of the present example have the form of so-called unloaded holes, and therefore the position adjusting part 14 can move in a certain range in the plane intersecting the rotation axis RA1. Therefore, the user of the machining jig MJ of the present example can loosen the mounting screws of the position adjusting part 14, then make the clamp arm 12 move in the direction of the arrow mark A20 of FIG. 2 and a direction vertical to the paper surface to adjust the position of the clamp arm 12 in the plane which intersects the rotation axis RA1.

Figure 4:
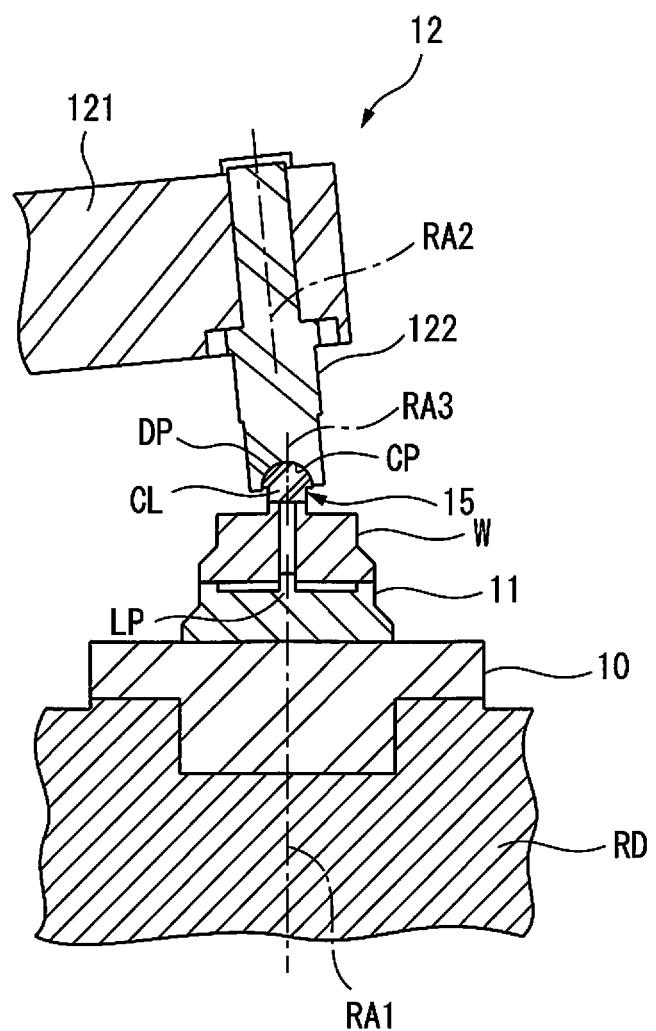
FIG. 4 is a partial enlarged view similar to FIG. 3 and shows the state where the rotation axis of the clamp arm is tilted with respect to the rotation axis of the seating part.

Next, a clamp arm 12 of the present example will be explained in detail. As shown in FIG. 2, the clamp arm 12 of the present example has an arm body 121 which extends in parallel with the top surface of the workpiece table 10, and a projecting part 122 which projects from the front end part of the arm body 121 toward the seating part 11. Here, the projecting part 122 of the present example is rotatably connected to the arm body 121 about the rotation axis RA2 which extends along the projecting direction. Below, the rotation axis RA2 of the projecting part 122 may for convenience be called the "rotation axis RA2 of the clamp arm 12". Further, in the present example, the above clamp member CL is attached to the front end part of the projecting part 122 in the projecting direction. When the projecting part 122 rotates about the rotation axis RA2, the clamp member CL also rotates together with the projecting part 122. Note that, the machining jig MJ of the present example is designed so that the rotation axis RA1 of the seating part 11 and the rotation axis RA2 of the clamp arm 12 are parallel to each other. However, as explained above, the clamp arm 12 of the present example has the form of a cantilever which extends from the position adjusting part 14. Due to the weight of the clamp arm 12 itself, the positioning error of the linear drive part LD, the reaction force which acts from the workpiece W to the clamp member CL while the clamp member CL pushes against the workpiece W, etc. the rotation axis RA2 of the clamp arm 12 may be tilted slightly from the rotation axis RA1 of the seating part 11. The tilted state of the rotation axis RA2 of the clamp arm 12 is illustrated in FIG. 4.

Next, a clamp member CL of the present example will be explained in detail. As shown in FIG. 1 and FIG. 2, the clamp member CL of the present example has the function of fastening the workpiece W to be machined to the machining jig MJ in cooperation with seating part 11. More specifically, when the clamp arm 12 is moved toward the seating part 11 by the drive force of the linear drive part LD, the clamp member CL contacts the workpiece W and pushes the workpiece W toward the seating part 11. Due to this, the workpiece W is stably fastened in a clamped state between the seating part 11 and the clamp member CL. Further, as shown in FIG. 2, between the clamp member CL and the projecting part 122 of the clamp arm 12, a tilt adjusting part 15 which adjusts the tilt of the clamp member CL from the projecting part 122 is interposed. The tilt adjusting part 15 of the present example is one of various universal joints, and configured to adjust the tilt of the clamp member CL so that the rotation axis of the clamp member CL which rotates together with the projecting part 122 becomes parallel with the rotation axis RA1 of the seating part 11. The specific structure of the tilt adjusting part 15 will be explained below.

Figure 3:
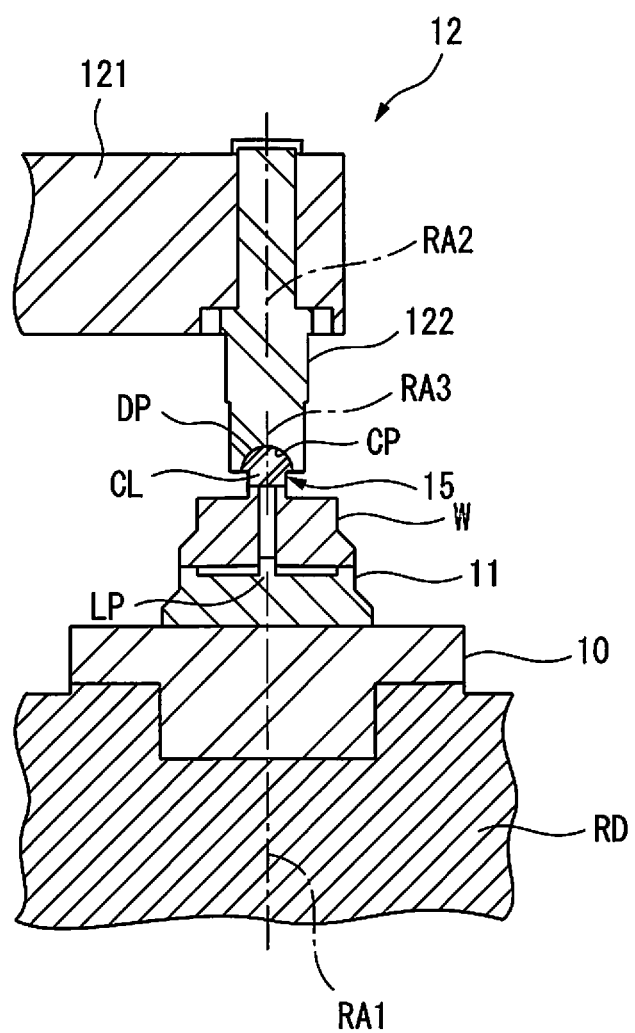
FIG. 3 is a partial enlarged view which shows the clamp member and its vicinity in the machining jig of FIG. 2.

FIG. 3 is a partial enlarged view which shows the clamp member CL and its vicinity in the machining jig MG of FIG. 2. Further, FIG. 4 is a partial enlarged view similar to FIG. 3 and shows exaggeratedly the state where the rotation axis RA2 of the clamp arm 12 is tilted with respect to the rotation axis RA1 of the seating part 11. As shown in FIG. 3 and FIG. 4, the tilt adjusting part 15 of the present example is a sliding contact part which comprises a curved depression part DP which is provided at the projecting part 122 of the clamp arm 12, and a curved convex part CP which is provided at the clamp member CL. However, unlike the example of FIG. 3 and FIG. 4, the curved depression part DP may also be provided at the clamp member CL, and the curved convex part CP may also be provided at the projecting part 122. The contact surfaces of the curved depression part DP and convex part CP are preferably coated with any of various lubricants for reducing friction between them. As will be understood if comparing FIG. 3 and FIG. 4, even if the rotation axis RA2 of the clamp arm 12 is tilted with respect to the rotation axis RA1 of the seating part 11, the tilt adjusting part 15 can freely change the tilt of the clamp member CL, and therefore the rotation axis RA3 of the clamp member CL can be made parallel to the rotation axis RA1 of the seating part 11. Further, when the position of the clamp arm 12 is suitably adjusted by the above position adjusting part 14, it is possible to align the rotation axis RA3 of the clamp member CL with the rotation axis RA1 of the seating part 11, as shown in FIG. 4.

As explained above, the machining jig MJ of the present example can adjust the position of the clamp member CL in the plane intersecting the rotation axis RA1 by means of the position adjusting part 14, and adjust the tilt of the clamp member CL from the projecting part 122 of the clamp arm 12 by means of the tilt adjusting part 15. Therefore, according to the machining jig MJ of the present example, even if the rotation axis RA2 of the clamp arm 12 is tilted with respect to the rotation axis RA1 of the seating part 11, it is possible to align the rotation axis RA3 of the clamp member CL with the rotation axis RA2 of the seating part 11 (see FIG. 4). As a result, it is possible to rotate the workpiece W in the state where the clamp member CL closely contacts the workpiece W, and therefore it is possible to prevent slip between the workpiece W and clamp member CL from occurring during rotation of the workpiece W and thus possible to prevent the workpiece W from being damaged by the clamp member CL. Furthermore, it is possible to reduce the transmission loss of the rotational drive force from the rotary drive part RD to the workpiece W and thus improve the machining precision of the cutting tool TL on the workpiece W.

Figure 5:
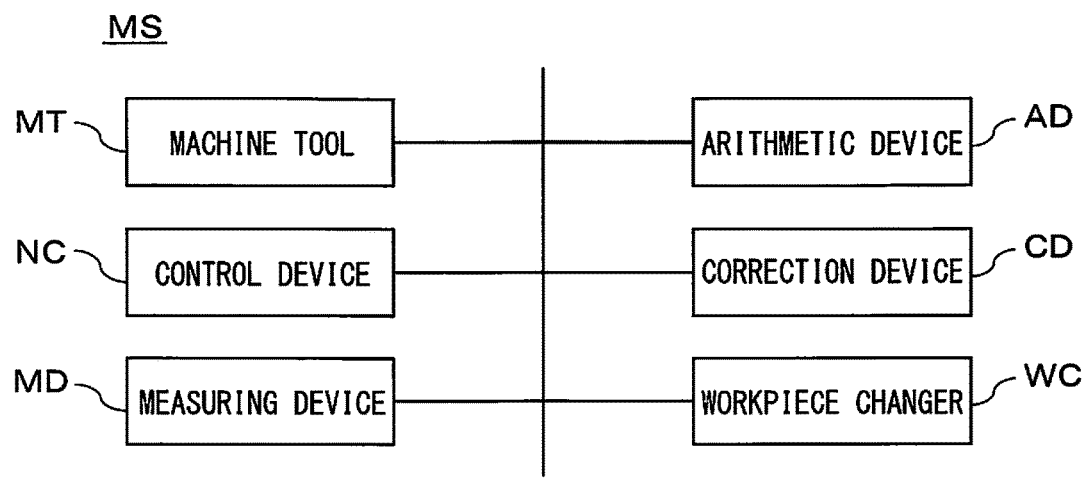
FIG. 5 is a block diagram which shows the configuration of a machining system including the machine tool of FIG. 1.

Next, referring to FIG. 5 to FIG. 8, a machining system which includes the above machine tool MT will be explained. FIG. 5 is a block diagram which shows the configuration of an illustrative machining system MS which includes a machine tool MT of FIG. 1. The machining system MS of the present example is capable of cutting carried out on the workpiece W in accordance with a previously prepared machining program. As shown in FIG. 5, the machining system MS of the present example includes not only the machine tool MT, but also a control device NC, measuring device MD, arithmetic logic device AD, correction device CD, and workpiece changer WC. These devices will be explained in order below.

The control device NC of the present example is a numerical control device of a machine tool MT, and capable of generating operation commands for the driving parts of the machine tool MT based on a previously prepared machining program. The "driving parts" referred to here indicate servo motors of the different axes of the machine tool MT. Next, the measuring device MD of the present example is a touch probe or optical sensor or other position detector, and configured to measure the position of the workpiece W which was placed on the seating part 11 of the above-mentioned machining jig MJ. Next, the arithmetic logic device AD of the present example is configured o calculate the offset amount of position of the workpiece W measured by the measuring device MD from the workpiece seating reference position which is previously set on the seating part 11. The offset amount of position of the workpiece W referred to here is a concept which includes not only the offset amount in the vertical direction along the axes of the X-axis, Y-axis, and Z-axis of FIG. 1, but also the offset amount in the rotation direction about the axes of the X-axis, Y-axis, and Z-axis of FIG. 1.

Figure 6:
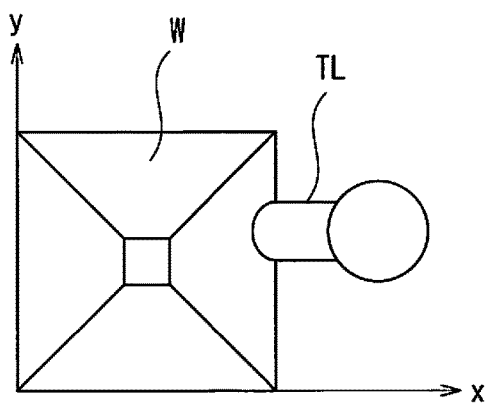
FIG. 6 is a first diagram for explaining a workpiece placement error correction function of a correction device in the machining system of FIG. 5.
Figure 7:
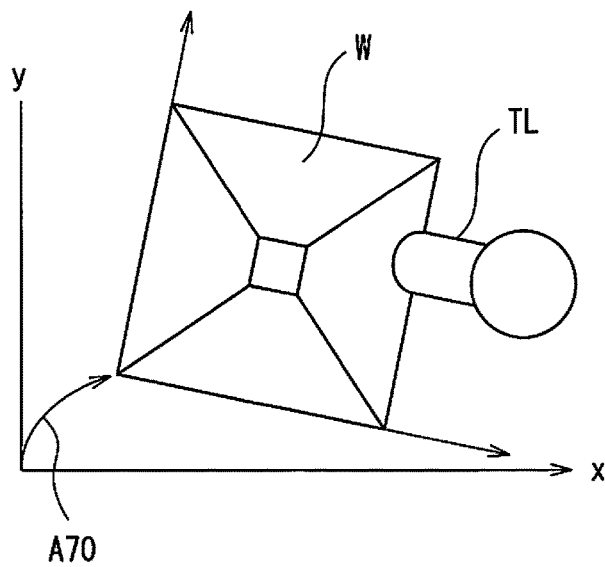
FIG. 7 is a second diagram for explaining a workpiece placement error correction function of a correction device in the machining system of FIG. 5.

Next, the correction device CD of the present example is configured to correct the operation commands which are generated by the control device NC so that the above offset amount is cancelled out while the machine tool MT performs cutting on the workpiece W. This function will be referred to below as the "workpiece placement error correction function". FIG. 6 and FIG. 7 are schematic views for explaining the workpiece placement error correction function of the correction device CD of the present example. Here, FIG. 6 shows the position of the cutting tool TL in a workpiece coordinate system in the case where the workpiece W is placed on the workpiece seating reference position. On the other hand, FIG. 7 shows the position of the cutting tool TL in the workpiece coordinate system in the case where the workpiece W is placed in an offset manner from the workpiece seating reference position. The offset amount in FIG. 7 is expressed by the arrow mark A70. The x-y coordinate system in FIG. 6 and FIG. 7 corresponds to the workpiece coordinate system. As will be understood from FIG. 6 and FIG. 7, the correction device CD of the present example corrects the operation commands generated by the control device NC so that the commanded position of the cutting tool TL in the machining program is changed in accordance with the offset amount calculated by the arithmetic logic device AD. Therefore, according to the workpiece setting error correction function of the correction device CD of the present example, it is possible to perform machining according to the initial machining program to even if a workpiece W is placed so as to be offset from the workpiece seating reference position.

Next, the workpiece changer WC of the present example is a robot or loader or other automatic conveyor and is capable of both a workpiece placement operation for gripping an unmachined workpiece W and placing it on the seating part 11 of the machining jig MJ, and a workpiece ejection operation for ejecting an already-machined workpiece W by the machine tool MT from the seating part 11 of the machining jig MJ. Note that, the dimension of the positioning projection LP of the seating, part 11 in the diametrical direction is somewhat smaller than the dimension of the center hole of the workpiece W in the diametrical direction so that the positioning projection LP does not obstruct the above workpiece ejection operation. Therefore, according to the workpiece changer WC of the present example, it is possible to establish an unmanned workpiece changing system which is capable of successively changing a machined workpiece W by a machine tool MT to an unmachined workpiece W.

Figure 8:
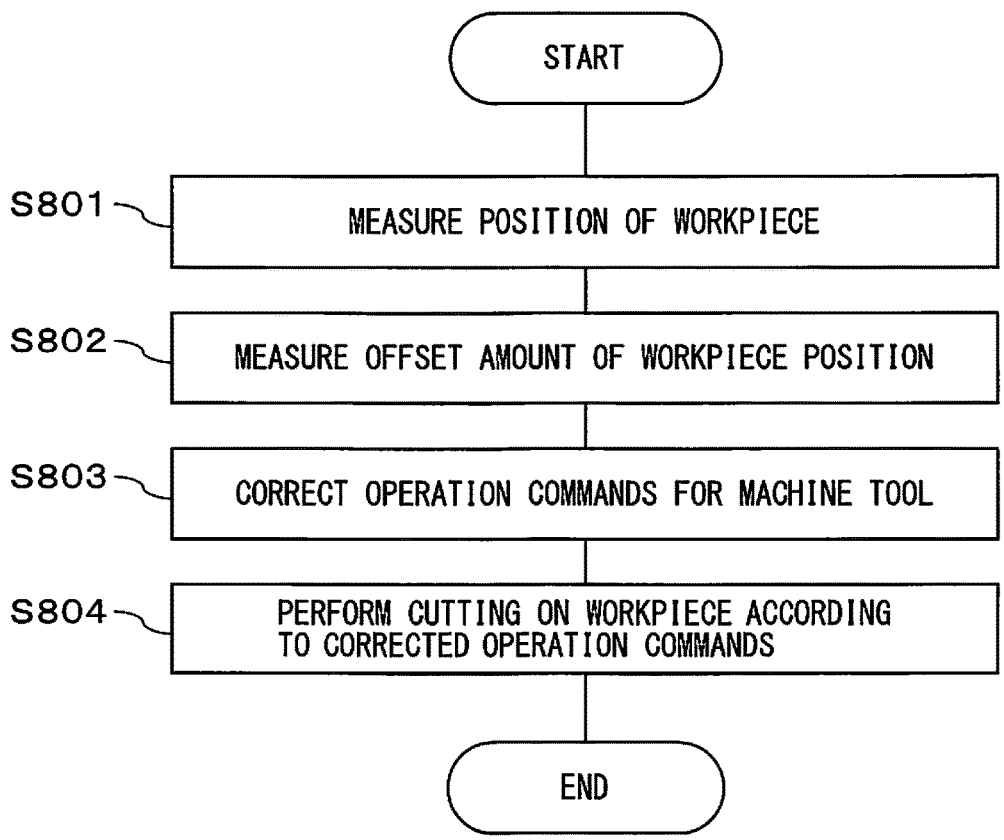
FIG. 8 is a flowchart which shows a procedure of cutting carried out on a workpiece according to the machining system of FIG. 5.

Next, the specific procedure of cutting on the workpiece W by the above workpiece setting error correction function will be explained. FIG. 8 is a flow chart which shows the procedure of cutting carried out on a workpiece W by the machining system MS of FIG. 5. As shown in FIG. 8, first, at step S801, the measuring device MD measures the position of the workpiece which is placed on the seating part 11 of the machining jig MJ. Next, at step S802, the arithmetic part AD calculates the offset amount of the measured position of the workpiece W by the measuring device MD, from the above workpiece seating reference position. Next, at step S803, the correction device CD corrects the operation commands to the machine tool MT generated by the control device NC so that the above offset amount is cancelled out during cutting on the workpiece W by the cutting tool TL of the machine tool MT (see FIG. 7). Next, at step S804, the machine tool MT performs cutting carried out on the workpiece W by moving the cutting tool TL in accordance with the operation commands which are corrected by the correction device CD. The machining system MS of the present example finishes cutting on the workpiece W thereafter.

As explained above, according to the machining system MS of the present example, the operation commands for the machine tool MT is corrected based on the calculation result of the offset amount of position of the workpiece W which is measured by the measuring device MD, and therefore it is possible to obtain a machining result in accordance with the machining program even if the position of the workpiece W is offset from the workpiece seating reference position. Therefore, it is possible to eliminate centering adjustment of the positioning projection LP of the seating part 11 with respect to the rotation axis RA1 of the rotary drive part RD, and thus shorten the time required for preparatory work even if the seating part 11 of the machining jig MJ is replaced according to the type of the workpiece W.

Effect of Invention

According to the first aspect of the present invention, it is possible to adjust the position of the clamp member in the plane intersecting the rotation axis of the seating part, and adjust the tilt of the clamp member from the clamp arm. Therefore, according to the first aspect of the present invention, it is possible to align the rotation axis of the clamp member with the rotation axis of the seating part even if the rotation axis of the clamp arm is tilted from the rotation axis of the seating part. As a result, the workpiece can be rotated in the state where the clamp member closely contacts the workpiece, and therefore it is possible to prevent slip between the rotating workpiece and the rotary type clamp member which pushes against the workpiece and thus prevent the workpiece from being damaged by the clamp member. Furthermore, it is possible to reduce the transmission loss of the rotary drive force which is transmitted from the rotary drive part to the workpiece and thus improve the machining precision of the workpiece by the machine tool.

According to the second aspect of the present invention, a tilt adjusting part comprising a curved depression part and a convex part slide contact part is employed, and therefore it is possible to simplify structures of the clamp arm and clamp member.

According to the third aspect of the present invention, the operation command for the machine tool is corrected based on the calculation result of the offset amount of position of the workpiece which is measured by the measuring device, and therefore it is possible to obtain a machining result in accordance with the machining program even if the position of the workpiece is offset from the workpiece seating reference position. Therefore, it is possible to eliminate the need for centering adjustment for the positioning projection of the seating part with respect to the rotation axis of the rotary drive part, and thus shorten the time required for preparatory work even if the seating part of the machining jig is replaced according to the type of the workpiece.

According to the fourth and fifth aspects of the present invention, it is possible to establish an unmanned workpiece changing system which is capable of successively replacing an already-machined workpiece by a machine tool with an unmachined workpiece.

The present invention is not limited to just the above embodiments and can be changed in various ways within the scope described in the claims. For example, although, a sliding contact part comprising a curved depression part and convex part was illustrated as the tilt adjusting part 15 of the clamp member CL in the above embodiments, the machining jig MJ of the present invention can also employ as the tilt adjusting part 15, any connecting member, including various universal joints, which is capable of freely adjusting the tilt of the clamp member CL with respect to the clamp arm 12. Further, the dimensions, shape, material, etc. of the parts of the machining jig MJ of the above-mentioned machine tool MT are just examples. Various dimensions, shapes, materials, etc. may be employed for realizing the effects of the present invention needless to say.

The invention claimed is:

1. A machining jig configured to rotatably support a workpiece with respect to a tool of a machine tool, the machining jig comprising:
   a seating part which has a top surface on which the workpiece is to be placed;
   a rotary drive part configured to rotate said seating part about a predetermined rotation axis;
   a clamp arm which has
      an arm body, and
      an axially rotatable projecting part which projects from a tip end part of said arm body toward said seating part, and a rotary clamp member which is
  attached to a tip end part of said projecting part,
  located at a position separated from said seating part in a direction along the rotation axis of said seating part, and
  configured to axially rotate together with said projecting part and fasten the workpiece in cooperation with said seating part;
a linear drive part configured to move said clamp arm in a direction along the rotation axis of said seating part;
a position adjusting part configured to adjust a position of said clamp arm in a plane intersecting the rotation axis of said seating part; and
a tilt adjusting part configured to adjust a tilt of a rotation axis of said clamp member with respect to a rotation axis of said projecting part so that the rotation axis of said clamp member becomes parallel with the rotation axis of said seating part,
wherein the rotary clamp member is configured to be tilted with respect to said projecting part such that a workpiece engaging surface of the rotary clamp member is parallel with the top surface of the workpiece, and
wherein the clamp arm has the form of a cantilever that projects from the position adjusting part.

2. The machining jig according to claim 1, wherein said tilt adjusting part is a sliding contact part which comprises:
  a curved depression part which is provided on the tip end part of said projecting part; and
  a curved convex part which is provided on said clamp member.

3. The machining jig according to claim 2, wherein said tilt adjusting part is a universal joint.

4. A machining system, comprising:
  the machine tool which has the machining jig according to claim 1,
  a control device configured to generate an operation command for the machine tool based on a predetermined machining program,
  a measuring device configured to measure a position of the workpiece which is placed on the seating part,
  an arithmetic device configured to calculate an offset amount of the position of the workpiece, which is measured by said measuring device, from a workpiece seating reference position which is previously set in said seating part, and
  a correction device configured to correct said operation command so that said offset amount is cancelled out while said machine tool machines the workpiece.

5. The machining system according to claim 4, further comprising:
  a workpiece changer configured to perform an operation for placing the workpiece, before being machined by said machine tool, on said seating part, and an operation for ejecting, from said seating part, the workpiece after being machined by said machine tool.

6. A machining system, comprising:
  the machine tool which has the machining jig according to claim 1, and
  a workpiece changer configured to perform an operation for placing the workpiece, before being machined by said machine tool, on said seating part, and an operation for ejecting, from said seating part, the workpiece after being machined by said machine tool.

* * * * *